(12) United States Patent
Cantadori et al.

(10) Patent No.: US 12,277,730 B2
(45) Date of Patent: Apr. 15, 2025

(54) SYSTEM AND METHOD OF CALIBRATING AN OPTICAL SENSOR MOUNTED ON BOARD OF A VEHICLE

(71) Applicant: Mahle Aftermarket Italy S.p.A., Parma (IT)

(72) Inventors: Andrea Cantadori, Parma (IT); Paolo Gandolfi, Parma (IT)

(73) Assignee: MAHLE AFTERMARKET ITALY S.P.A. (IT)

( * ) Notice: Subject to any disclaimer, the term of this patent is extended or adjusted under 35 U.S.C. 154(b) by 0 days.

(21) Appl. No.: 17/701,362

(22) Filed: Mar. 22, 2022

(65) Prior Publication Data

US 2022/0284629 A1 Sep. 8, 2022

Related U.S. Application Data

(63) Continuation of application No. 16/447,918, filed on Jun. 20, 2019, now abandoned.

(30) Foreign Application Priority Data

Jun. 21, 2018 (EP) .................................... 18178983

(51) Int. Cl.
  *G06T 7/80* (2017.01)
  *B60R 11/04* (2006.01)
  (Continued)

(52) U.S. Cl.
  CPC ............... *G06T 7/80* (2017.01); *B60R 11/04* (2013.01); *G01S 7/4021* (2013.01);
  (Continued)

(58) Field of Classification Search
  None
  See application file for complete search history.

(56) References Cited

U.S. PATENT DOCUMENTS 5,748,505 A  5/1998 Greer
9,217,914 B2  12/2015 Choi
(Continued)

FOREIGN PATENT DOCUMENTS

DE  10246066 A1  4/2004
DE  102009028606 A1  2/2011
(Continued)

*Primary Examiner* — James J Lee
*Assistant Examiner* — Tawri M McAndrews
(74) *Attorney, Agent, or Firm* — Fishman Stewart PLLC

(57) ABSTRACT

An apparatus and method of calibrating a vehicle optical sensor includes positioning a vehicle in a test station and proximate a projection surface, the vehicle having an optical sensor, the projection surface in view of the optical sensor, determining a position of the optical sensor with respect to the projection surface using a control unit that is external to the vehicle, and selecting an image to be displayed. The method further includes displaying the image from the projection surface, adapting the image displayed from the projection surface to dimensions of the projection surface, using the control unit, based on a size of the projection surface and the position of the optical sensor, spatially adjusting the projection surface with respect to the position of the optical sensor, and calibrating the optical sensor by adjusting a position of an optical axis of the optical sensor based on the image.

22 Claims, 2 Drawing Sheets

(51) Int. Cl.
  *G01S 7/40*   (2006.01)
  *G01S 7/497*   (2006.01)
  *G01S 13/931*   (2020.01)
  *G01S 17/931*   (2020.01)
  *G07C 5/08*   (2006.01)
  *H04N 9/31*   (2006.01)

(52) U.S. Cl.
  CPC .......... *G01S 7/4972* (2013.01); *G01S 13/931* (2013.01); *G01S 17/931* (2020.01); *G07C 5/0808* (2013.01); *G07C 5/0841* (2013.01); *H04N 9/3185* (2013.01); *B60R 2300/402* (2013.01); *G06T 2207/30252* (2013.01)

(56) References Cited

U.S. PATENT DOCUMENTS

| | | | |
|---|---|---|---|
| 9,247,222 | B2 | 1/2016 | Sieler |
| 9,794,552 | B1 | 10/2017 | Ribble |
| 10,089,753 | B1 | 10/2018 | Fegyver |
| 10,365,355 | B1* | 7/2019 | Colarelli, III ........ G01S 7/4972 |
| 10,788,316 | B1 | 9/2020 | Kalscheur |
| 10,788,400 | B2 | 9/2020 | Stieff |
| 10,935,465 | B1 | 3/2021 | Stieff |
| 10,942,045 | B1 | 3/2021 | Crawford |
| 2001/0012985 | A1 | 8/2001 | Okamoto |
| 2004/0133376 | A1 | 7/2004 | Uffenkamp |
| 2006/0164295 | A1 | 7/2006 | Focke |
| 2009/0326757 | A1* | 12/2009 | Andreasen ............ G07C 5/008 701/29.6 |
| 2010/0082281 | A1* | 4/2010 | Nakamura ................ G06T 7/80 702/95 |
| 2010/0238291 | A1 | 9/2010 | Pavlov |
| 2010/0245592 | A1 | 9/2010 | Inui |
| 2011/0032215 | A1 | 2/2011 | Sirotich |
| 2013/0257822 | A1 | 10/2013 | Holmgren |
| 2013/0325252 | A1 | 12/2013 | Schommer |
| 2014/0233023 | A1 | 8/2014 | Soininen |
| 2014/0320658 | A1 | 10/2014 | Pliefke |
| 2015/0049193 | A1 | 2/2015 | Gupta |
| 2015/0134191 | A1 | 5/2015 | Kim |
| 2015/0145999 | A1 | 5/2015 | Kim |
| 2016/0161602 | A1 | 6/2016 | Prokhorov |
| 2017/0054974 | A1 | 2/2017 | Pliefke |
| 2017/0322048 | A1 | 11/2017 | Yoshida |
| 2017/0332052 | A1 | 11/2017 | Lu |
| 2018/0052223 | A1 | 2/2018 | Stieff |
| 2018/0067198 | A1 | 3/2018 | Valois |
| 2018/0100783 | A1 | 4/2018 | Stieff |
| 2019/0012808 | A1* | 1/2019 | Mou ........................ G08G 1/16 |
| 2019/0031482 | A1 | 1/2019 | Barron |
| 2019/0055015 | A1* | 2/2019 | Allard .................. B64C 39/024 |
| 2019/0180475 | A1 | 6/2019 | Nash |
| 2019/0204184 | A1* | 7/2019 | Neumann ............... G06T 7/593 |
| 2019/0204425 | A1 | 7/2019 | Abari |
| 2021/0197841 | A1 | 7/2021 | Barcin |

FOREIGN PATENT DOCUMENTS

| | | |
|---|---|---|
| DE | 102015118874 A1 | 5/2017 |
| EP | 1260832 A1 | 11/2002 |
| EP | 1376051 A1 | 1/2004 |
| GB | 2396005 B | 4/2005 |
| WO | 2014192347 A1 | 12/2014 |
| WO | 2015/092594 A1 | 6/2015 |
| WO | 2015092594 A2 | 6/2015 |
| WO | 2015092594 A3 | 6/2015 |
| WO | 2017/016541 A1 | 2/2017 |
| WO | 2018067354 A1 | 4/2018 |
| WO | 2019/015847 A1 | 1/2019 |

\* cited by examiner

SYSTEM AND METHOD OF CALIBRATING AN OPTICAL SENSOR MOUNTED ON BOARD OF A VEHICLE

CLAIM FOR PRIORITY

This application is a Continuation of U.S. application Ser. No. 16/447,918, filed on Jun. 20, 2019, which claims priority to European Application No. 18178983.5, which was filed on Jun. 21, 2018, the contents of which are fully incorporated by reference herein.

FIELD

The subject matter described herein relates to a system and method of calibrating an optical sensor mounted on board of a vehicle.

BACKGROUND

Over recent years, the attention of those developing the safety of motor vehicles has extended from the traditional passive safety systems (airbags, seat belts, impact resistance, etc.) to advanced active safety systems, known to specialists as ADAS (Advanced Driver Assistance Systems).

ADAS systems are electronic driving assistance systems for vehicles that support the driver for the purpose of increasing safety and/or driving comfort. Such systems have been classified into six levels according to the degree of autonomy, as indicated below:

- Level 0 (no automation): the driver is in charge of all the driving aspects, even when he/she is facilitated by the systems installed on board of the vehicle.
- Level 1 (driver assistance): in some situations the vehicle can accelerate, brake or steer autonomously, but the driver must be ready at all times to regain control of the vehicle.
- Level 2 (partial automation): the vehicle has full control of the accelerator, brake and steering, but the driver must still monitor the surrounding environment.
- Level 3 (conditioned automation): the vehicle has full control of the accelerator, brake, steering and monitoring of the environment, but the driver must be ready to intervene if required by the system.
- Level 4 (high automation): the automatic system is able to handle any event, but must not be activated in extreme driving conditions such as in bad weather.
- Level 5 (complete automation): the automatic driving system is able to handle all driving situations; there is no longer any need for intervention by a human driver.

Currently, the most advanced vehicles are equipped with level 3 systems. The objective over coming years is to reach level 5 in most of the vehicles on the roads.

By way of example, ADAS systems that are already widespread include adaptive cruise control, automatic full-beam headlamp adjustment, automatic headlamp orientation, automatic parking system, navigation system with traffic information, night vision system, blind spot monitor, frontal collision warning system, automatic emergency braking, etc.

At technological level, ADAS systems are based on a plurality of sensors (television cameras, radar, Lidar, etc.) able to detect different information that can possibly be used as the input data for a smart algorithm that oversees the degree of autonomy of the vehicle.

Before the vehicle is placed on the market, the sensors are calibrated directly by the manufacturer. For example, the initial calibration of a television camera is performed through a simulation environment specifically provided by the manufacturer in which the television camera is placed opposite a monitor onto which settable dynamic scenarios are projected (e.g. a pedestrian crossing the road).

After the vehicle has been placed on the market, the sensors are calibrated periodically (e.g. when the vehicle is serviced) or after exceptional events (e.g. replacement of the sensor following a defect, damage or breakdown warning).

BRIEF SUMMARY

In summary, one aspect provides a calibration system that calibrates an optical sensor mounted on board of a vehicle, comprising: a test station consisting of a horizontal or inclined support zone for supporting the vehicle; a projection surface for images or videos, said projection surface being located in front of said test station; at least one memory containing a plurality of images and/or videos archived by type of optical sensor; a calibration unit for calibrating the optical sensor configured to adjust the position of the optical axis of said optical sensor; and a control unit which, in response to a signal representing the type of said optical sensor, is configured to: search in said memory for at least one image or video archived in association with the type of said optical sensor; command the projection onto said projection surface of the image or video found in said memory or a processed version of said image or said video; interface with said calibration unit; and adapt or deform the image or video found in said memory to the size of the projection surface.

Another aspect provides a method of calibrating an optical sensor mounted on board of a vehicle, comprising the steps of: positioning the vehicle in a test station consisting of a horizontal or inclined support zone for supporting the vehicle; arranging a projection surface for images or videos in front of said test station; identifying the type of said optical sensor; selecting in a memory an image or video associated with the type of said optical sensor; adapting or deforming the image or video selected in said memory (6) to the size of the projection surface; projecting the image or video selected or the adapted or deformed version thereof onto said projection surface; and adjusting the position of the optical axis of said optical sensor starting from said projected image or video.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
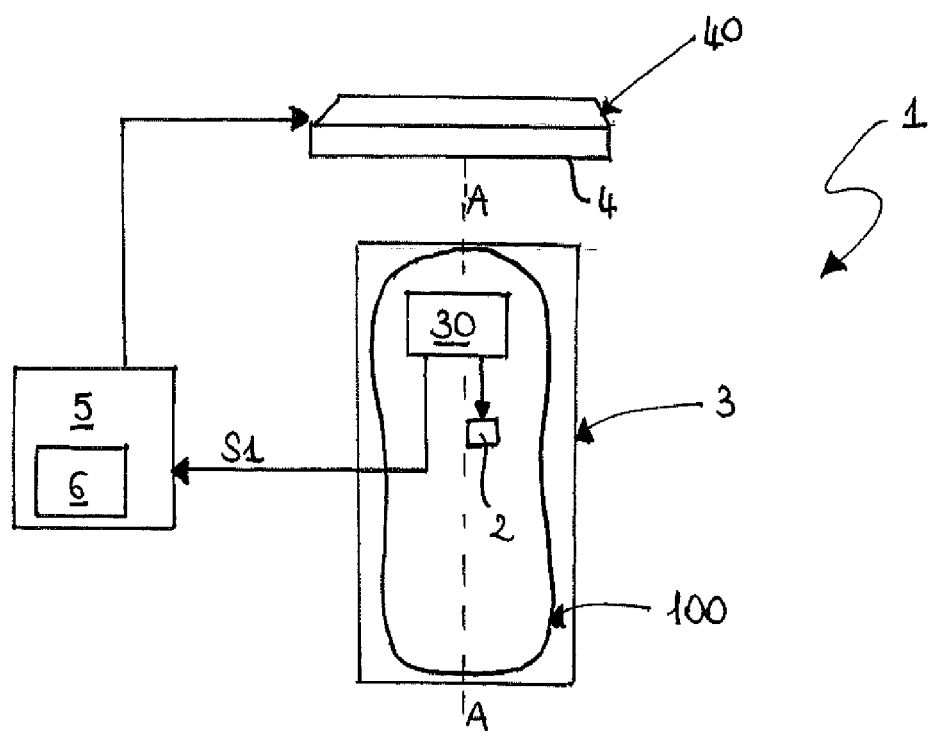
FIG. 1 schematically illustrates a system of calibrating an optical sensor mounted on board of a vehicle, according to an embodiment.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Two types of calibration are currently performed in the aftermarket: static and dynamic.

Static calibration is performed in a closed environment (generally the workshop) through a portable device—known in the sector as a "scan tool"—connected to the vehicle's EOBD (European On Board Diagnostic) diagnostic socket and using specific target panels for each type of sensor (e.g. photo camera, radar, Lidar, etc.) usually placed on the front of the stationary vehicle (they can also be positioned on the side or the rear of the vehicle). An example of such a calibration method is proposed in patent US 2013/0325252.

The main criticality of the static calibration methods known to date is connected with the wide variety of parameters at stake. As every manufacturer requires ad hoc calibration settings for each vehicle model and for each type of sensor, workshops are generally affiliated to only some manufacturers, for which they must be equipped with the related target panels (numerous ones as they differ in terms of shape, size and pattern).

Furthermore, to guarantee reliable calibration, it is essential to guarantee the correct transverse and longitudinal alignment of the target panels with respect to the vehicle. At each calibration, the panel alignment step takes a long time.

The movement of the panels also requires special care to prevent damage and breakages. In fact, the panels are made of plastic material, generally forex, and have a significant extension with respect to the thickness, which is reduced (usually max 5 mm).

Furthermore, static calibration cannot take place outdoors as there must be a well defined contrast of the panels.

For some types of vehicles, static calibration is not sufficient but an on-road test is required.

In that case, dynamic calibration methods are applied, i.e. performed while driving the vehicle. Two scenarios are possible:
- dynamic calibration performed automatically by the vehicle systems while a generic driver is driving,
- dynamic calibration using a scan tool connected to the vehicle's EOBD diagnostic socket for performing specific calibration procedures established by the manufacturer, performed by an authorized repairer.

A first limit of dynamic calibration is connected with the fact that it must be performed under good weather conditions, with the clear planning difficulties of the time scales. A second limit is connected with the need to provide paths with determined characteristics (horizontal signage, vertical signage, etc.) for performing the calibration.

Furthermore, during dynamic calibration the vehicle could have unexpected reactions (precisely due to calibration errors), which put the driver's safety at risk.

The aftermarket calibration methods known to date (static and dynamic) require long performance times to guarantee the reliability of the results.

From US 2018/100783 it is already known a calibration system for optical sensors using a screen or other projection surface disposed within the field of view of an optical sensor system onboard a vehicle.

From WO 2018/067354 it is disclosed an ADAS calibration support structure in which it is possible to project indicia on a screen and to correct parallax distortion by means of mechanical rotation of a laser emitter.

From WO 2014/192347 it is also known an inspection system for an optical sensor.

In U.S. Pat. No. 9,247,222 a projection display for images is disclosed, that may be applied to a vehicle.

In DE 10 2006060 553 there is disclosed a method for testing a motor vehicle driver assistance system.

In this context, the technical task underpinning an embodiment is to provide a system and method of calibrating an optical sensor mounted on board of a vehicle, that obviate the above-cited drawbacks.

In particular, it an embodiment provides a universal system of calibrating an optical sensor mounted on board of a vehicle, i.e. that can be used for the sensors of any vehicle, regardless of the manufacturer, the specific model and the ADAS system being implemented and, at the same time, more reliable and compact with respect to known solutions.

An embodiment provides a method for calibrating an optical sensor mounted on board of a vehicle that can be performed in a shorter time and more easily with respect to the calibration methods known to date.

A further embodiment provides a system and method of calibrating an optical sensor mounted on board of a vehicle, which are reliably applicable also to vehicles that normally require an on-road test, i.e. dynamic calibration.

The stated technical task are substantially achieved by a system of calibrating an optical sensor mounted on board of a vehicle, comprising:
- a test station for the stationary vehicle;
- a projection surface for images or videos, which is located in front of the test station;
- at least one memory containing a plurality of images and/or videos archived by type of optical sensor;
- a calibration unit for calibrating the optical sensor configured to adjust the position of the optical axis of the optical sensor;
- a control unit which, in response to a signal representing the type of the optical sensor, is configured to:

search in the memory for at least one image or video archived in association with the type of optical sensor;
command the projection onto the projection surface of the image or video found in the memory or a processed version of the image or video;
interface with the calibration unit.

In accordance with one embodiment, the control unit is also configured to determine, in response to the signal representing the type of optical sensor, a spatial position of the projection surface with respect to the optical sensor mounted on board of the vehicle arranged in the test station.

In accordance with one embodiment, the control unit is also configured to adapt or deform the image or video found in the memory to the dimensions of the projection surface, in response to the signal representing the type of optical sensor.

In accordance with one embodiment, the calibration system further comprises a screen or monitor located in front of the test station, the projection surface being the display of said monitor.

In accordance with one embodiment, the calibration system further comprises a television set, said monitor being the monitor of said television set.

In accordance with one embodiment, the calibration system further comprises a multimedia interactive board, said monitor being the monitor of the multimedia interactive board.

In accordance with one embodiment, the calibration system further comprises a computer, said monitor being the monitor of the computer.

In accordance with one embodiment, the projection surface is obtained from a sheet made of PVC.

In accordance with one embodiment, the calibration system further comprises a projector or a luminous board, said control unit being configured to command the projector or luminous board to project the image or video found in the memory onto the projection surface.

Preferably, in response to the signal representing the type of optical sensor, the control unit is configured to project a set of parameters or initial calibration conditions onto said projection surface.

Preferably, the calibration system also comprises an automatic means for adjusting the spatial position of the projection surface with respect to the test station.

The stated technical task and specified objects are substantially achieved by a method of calibrating an optical sensor mounted on board of a vehicle, comprising the steps of:
positioning the vehicle in a test station;
arranging a projection surface for images or videos in front of said test station;
identifying the type of optical sensor;
selecting in a memory an image or video associated with the type of said optical sensor;
projecting the image or video selected or a processed version thereof onto the projection surface;
adjusting the position of the optical axis of the optical sensor starting from said projected image or video.

In accordance with one embodiment, the calibration method further comprises a step of determining, according to the type of optical sensor, a spatial measurement position that the projection surface must assume with respect to the optical sensor during calibration.

In accordance with one embodiment, the calibration method further comprises a step of adapting or deforming the image or video selected based on the size of the projection surface and the distance from the optical sensor.

Further characteristics and advantages will become more apparent from the indicative and thus non-limiting description of a preferred, but not exclusive, embodiment of a system and method of calibrating an optical sensor mounted on board of a vehicle, as illustrated in the accompanying drawings.

With reference to the figures, the number 1 indicates a system of calibrating an optical sensor 2 mounted on board of a vehicle 100, in particular a motor vehicle such as an automobile, a bus, a lorry, a road tractor, a tractor trailer, an articulated lorry, a farm machinery, a working vehicle, a self-propelled vehicle, etc.

For example, the optical sensor 2 is a CMOS or CCD type sensor of a television camera installed on the vehicle 100.

The calibration system 1 preferably comprises:
a test station 3 for the stationary vehicle 100;
a projection surface 4 for projecting images or videos.

In particular, the test station 3 consists of a horizontal or inclined support zone for supporting the vehicle 100.

The stationary vehicle 100 is arranged in the test station 3 according to techniques and with means of the known type, which are not the subject matter this disclosure.

The projection surface 4 is arranged in front of the test station 3 so that the optical sensor 2 can acquire images or videos projected onto such projection surface 4.

Preferably, the projection surface 4 is rectangular shaped.

Preferably, the calibration system 1 comprises a screen or monitor, whose display constitutes the projection surface 4.

Figure 2:
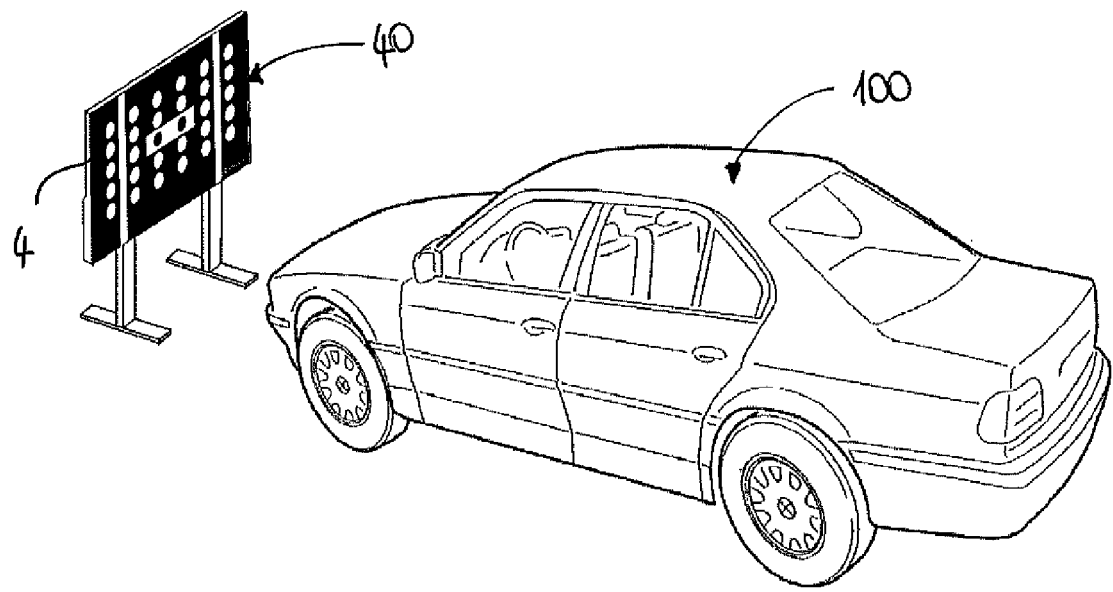
FIG. 2 and FIG. 3 illustrate the reciprocal arrangement of a vehicle in the test station and a projection surface of the calibration system of FIG. 1, in a perspective view, in which the projection surface projects a pattern and a video, respectively.
Figure 3:
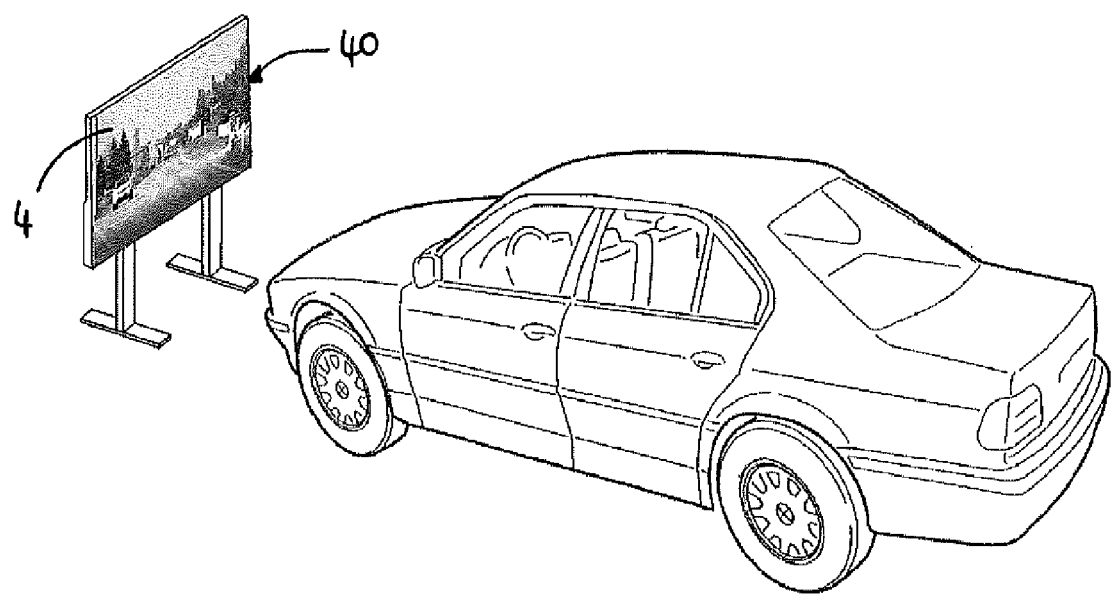
Figure 4:
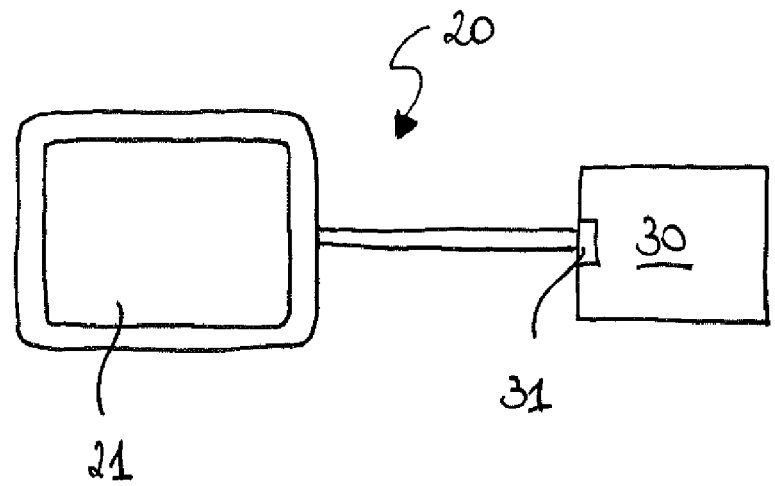
FIG. 4 schematically illustrates the communication between a scan tool and a calibration unit of the calibration system of FIG. 1.

The monitor comprising the projection surface 4 may be a monitor of a television set 40, as illustrated in FIGS. 2 and 3.

For example, the monitor of the television set 40 may be plasma, liquid crystal, OLED.

For example, a television set 40 can be used with a 65" or greater anti-glare monitor.

Alternatively, the monitor comprising the projection surface 4 is the monitor of a multimedia interactive whiteboard (often indicated by the acronym IWB), or the monitor of a computer.

In accordance with another embodiment, the calibration system 1 comprises a projector or a video projector or a luminous board that projects images or videos onto the projection surface 4, preferably made of (polarised or lenticular) high-contrast PVC fabric.

For example, the projection surface 4 is the surface of a fabric sheet which when unrolled and taut, must have a planarity of +/−2 millimetres per linear metre. Preferably, the fabric is opaque white so as to have a good contrast.

The calibration system 1 comprises a control unit 5 which receives at least one input signal (indicated as S1) representing the type of optical sensor 2. In response to such signal S1, the control unit 5 is configured for:
selecting an image or a video in a memory 6;
commanding the projection onto the projection surface 4 of the image or video selected or a processed version thereof.

In particular, the memory 6 is part of the calibration system 1 and contains a plurality of images and/or videos archived by type of optical sensor.

In fact, on board of the vehicle 100, different television cameras, stereo pairs etc. can be installed. Each of such devices has optical sensors of different types that together form an ADAS system. Above all, according to the manufacturer and the model, the vehicle 100 has its own ADAS system, therefore each optical sensor requires ad hoc calibration.

The selection of the image or video by the control unit 5 is performed by searching in the memory 6 for at least one image or video that is archived in association with the type of that particular optical sensor 2 subject to calibration.

For example, the image projected onto the projection surface 4 can reproduce the shape, size and pattern of a target panel for the calibration of a specific optical sensor.

In the case of a video, it is possible to display a real dynamic scenario or a simulated one, which reproduces an on-road test of the vehicle.

For example, the control unit 5 is housed in a portable device 20 (generally known in the sector as a scan tool) which can be connected to the vehicle's 100 EOBD diagnostic socket 31.

The memory 6 can be housed in the same portable device 20.

Alternatively, it may be the computer memory, or an external memory (e.g. USB memory connectible directly to the television set 40).

If the projection surface 4 is composed of the fabric sheet, then the control unit 5 is configured to command the projector or video projector or luminous board to project the image or video onto such projection surface 4.

Preferably, in a preliminary step it is necessary to configure the calibration system 1. For this reason, the control unit 5 is configured to project onto the projection surface 4 a set of parameters or initial calibration conditions, in response to the signal S1 representing the type of optical sensor 2.

The calibration of the optical sensor 2, meaning the adjustment of the position of the optical axis, takes place by a calibration unit 30 that interfaces with the control unit 5. The calibration unit 30 is preferably part of the vehicle's 100 electronic control unit and it interfaces with the control unit 5 of the scan tool 20 through the connection to the EOBD diagnostic socket 31.

In accordance with one embodiment, the control unit 5 is also configured to determine a spatial position of the projection surface 4 with respect to the optical sensor 2 mounted on board of the vehicle 100 arranged in the test station 3. Such determination is performed based on the signal S1 representing the type of optical sensor 2.

Preferably, the calibration system 1 also comprises an automatic means for adjusting (i.e. regulating) the spatial position of the projection surface 4 with respect to the test station 3. Said adjusting means is of the known type and will not be described further.

This position adjustment of the projection surface 4 is usually used in the event in which the vehicle 100 is placed on a horizontal support surface.

In accordance with another embodiment, the control unit 5 is also configured to process the images or videos resident in the memory 6. In particular, the control unit 5 is configured to adapt or deform the selected image or video to the size of the projection surface 4. Such adaptation is performed in response to the signal S1 representing the type of optical sensor 2.

For example, if the vehicle 100 in the test station 3 is placed on an inclined plane, the image or video is to be deformed rather than adjusting the spatial position of the projection surface 4 with respect to the optical sensor 2.

For example, the vehicle's 100 support plane is inclined forwards by a maximum of 1° with respect to the horizontal.

Or, the vehicle's 100 support plane is inclined backwards by a maximum of 3° with respect to the horizontal.

It is also envisaged that the control unit 5 is configured to perform both a determination of the spatial position of the projection surface 4 with respect to the optical sensor 2 mounted on board of the vehicle 100 in the test station 3 and a deformation of the selected images or videos.

In that case, the determination of the spatial position is rough, and is performed from a deformed projection of the image or video.

The method of calibrating an optical sensor mounted on board of a vehicle, according to an embodiment, is described below.

First of all, the vehicle 100 is parked in the test station 3, according to known techniques, as already mentioned above.

The projection surface 4, e.g. the display of a monitor, is arranged in front of the test station 3, in particular transverse to the longitudinal axis AA of the vehicle 100.

The operator then connects the portable device 20 (scan tool) to the EOBD diagnostic socket 31 of the vehicle 100.

The portable device 20 has a screen 21 on which a graphical interface is displayed, configured to allow text or instructions to be entered by an operator.

In particular, the operator can select the vehicle 100 to be calibrated, by choosing from different types of vehicles split into brands (manufacturers) and models.

Alternatively, the portable device 20 performs such selection automatically or semi-automatically, asking the operator to confirm that the vehicle 100 detected is the correct one.

The operator also selects the ADAS system to be calibrated, specifically the optical sensor 2 to be calibrated. Also in this case, the selection can take place manually, automatically or semi-automatically.

These detection or selection steps of the vehicle 100 and of the type of optical sensor 2 to be calibrated are known in themselves and therefore are not the subject matter of this disclosure.

Once the type of optical sensor 2 has been identified, the control unit 5 (in the scan tool 20) can determine the spatial measurement position that the monitor must assume with respect to the optical sensor 2 during calibration.

Such determination takes place, for example, in the case of a vehicle 100 placed on a horizontal support surface.

The spatial measurement position is preferably displayed in the form of instructions on the projection surface 4.

It is known that the mutual position of the optical sensor and its target (in this case the display or, in general, the projection surface) must be adjusted according to the type of optical sensor and the position that it occupies in the vehicle 2.

Preferably, other parameters or initial calibration conditions are also projected onto the projection surface 4.

The operator then manually adjusts the projection surface 4 until the latter assumes the spatial measurement position. Alternatively, the adjustment of the position of the projection surface 4 takes place automatically.

Once this adjustment has been performed, the operator confirms to the portable device 20 (still through the graphical interface that can be loaded onto its screen 21) that the preliminary step has been performed and the actual calibration can take place. The operator can choose whether to perform a calibration with a static image or a dynamic video.

The control unit 5 searches inside the memory 6 for the image (in the former case) or the video (in the latter case) associated with the type of optical sensor 2 to be calibrated.

The image or video selected can then be displayed on the projection surface 4.

Once the target (which in this case is the projection surface 4) has been adjusted and the image or video has been projected, the calibration is performed by the calibration unit 30 which communicates with the scan tool 20. The actual calibration, meaning the adjustment of the position of the optical axis of the optical sensor 2, takes place according to an algorithm of the known type.

Once the optical sensor 2 has been calibrated, the operator can easily repeat the aforesaid method for other optical sensors located on board of the vehicle 100.

Alternatively to the determination of the spatial position that the projection surface 4 must have and its subsequent adjustment, it is possible to project a deformed image or video onto the projection surface 4. Such solution, used in particular when the vehicle 100 is on a horizontal support surface, is particularly advantageous because it prevents having to adjust the position of the projection surface 4.

Finally, it is also possible to adopt a combined solution, in which the spatial adjustment is performed on both the position of the projection surface 4 and a projection of the deformed image/video.

A similar calibration system may also be applied for the calibration of a radar mounted on board of a vehicle, i.e. a frontal radar.

According to prior art solutions, the calibration of the frontal radar is achieved by means of a plane reflector arranged at a certain distance D from the radar and perpendicular to the axis of the radar.

Usually, the manufacturers declare a certain tolerance $\Delta D$ range for the distance D, i.e. D$\pm\Delta D$, in the arrangement of the plane reflector with respect to the radar.

Nevertheless, it is well-known in this field that a deviation, even of a few degrees, in the orthogonal arrangement of the plane reflector with respect to the radar results in failure of the calibration.

Applying to the frontal radar a system and the method similar proposed herewith for the optical sensor, the user simply place the plane reflector in front of the radar at the distance D recommended by the manufacturer, then he inserts the relevant distances obtained by means of laser meters, and the system calculates the magnitude of the angle that the plane reflector needs to be rotated. Furthermore, the system indicates to the user whether and of which amount the plane reflector shall slide right or left in order to be centred with respect to the radar.

In practice, in the calibration of a radar, the radar substitutes the optical sensor 2, while the plane reflector substitutes the projection surface 4.

The characteristics and the advantages of the system and method of calibrating an optical sensor mounted on board of a vehicle, according to an embodiment, are clear, as are the advantages.

In particular, the use of a surface onto which the images are projected prevents the storage or delicate handling in the workshop of numerous target panels having different shapes, sizes and patterns.

In the solution using a screen, e.g. of a television set, the calibration system proposed herein further allows a contrast to be achieved that is also compatible with use in an open environment.

Furthermore, the screen also allows videos that reproduce real dynamic or simulated scenarios to be projected. Therefore, even for static calibration (i.e. with the vehicle stationary), comparable performance levels are obtained to those of dynamic calibration, which can therefore be prevented for vehicles which usually required an on-road test. Preventing the on-road test simplifies planning (connected with weather and road conditions) and prevents risks for the driver.

The method and system proposed can also be used in the event of inclination of the vehicle (within certain limits) because it is sufficient to suitably deform the image/video to be projected onto the screen instead of performing the spatial adjustment of the screen with respect to the vehicle.

In addition, in case of calibration of the radar, the user may save up to 20 minutes times for each vehicle.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method of calibrating a vehicle optical sensor, comprising:
    positioning a vehicle in a test station and proximate a projection surface, the vehicle having an optical sensor, the projection surface in view of the optical sensor, the projection surface positioned in front of the vehicle;
    determining a position of the optical sensor with respect to the projection surface using a control unit that is external to the vehicle;
    selecting an image or video to be displayed;
    displaying the image or video from the projection surface;
    adapting the image or video displayed from the projection surface to dimensions of the projection surface, using the control unit, based on a size of the projection surface and the position of the optical sensor;
    adjusting a spatial position of the projection surface with respect to the position of the optical sensor based on the adapted image or video after the displaying step; and
    calibrating the optical sensor by adjusting a position of an optical axis of the optical sensor based on the image or video.

2. The method of claim 1, wherein adjusting the spatial position of the projection surface with respect to the optical sensor further comprises automatically adjusting the spatial position of the projection surface with respect to the optical sensor.

3. The method of claim 1, wherein spatially adjusting the projection surface with respect to the test station further comprises manually adjusting the spatial position of the projection surface with respect to the optical sensor.

4. The method of claim 1, wherein adapting the image or video displayed from the projection surface further comprises deforming the image or video to the dimensions of the projection surface.

5. The method of claim 1, wherein the image or video is a video.

6. The method of claim 1, wherein displaying the image or video from the projection surface further comprises projecting the image or video from a projector to the projection surface.

7. The method of claim 1, wherein displaying the image or video from the projection surface further comprises projecting the image or video from no more than one projection surface.

8. The method of claim 1, wherein displaying the image or video from the projection surface includes displaying the image or video from a television set.

9. The method of claim 1, further comprising selecting the vehicle via an operator by choosing from different types of vehicles based on at least one of a manufacturer brand and model.

10. The method of claim 1, further comprising automatically or semi-automatically selecting the vehicle for calibration, and requesting an operator to confirm the selected vehicle via a portable device comprising the control unit.

11. A calibration system for calibrating an optical sensor in a vehicle, comprising:
    a projection surface;
    a test station for a vehicle such that, when the vehicle is positioned in the test station the projection surface is positioned in front of the vehicle, such that an optical sensor positioned in the vehicle has a view of the projection surface;
    a control unit electrically connectable to the optical sensor and external to the vehicle, the control unit configured to:
    determine a position of the optical sensor with respect to the projection surface;
    select an image or video to be displayed;
    display the image or video on the projection surface;
    adapt the image or video displayed on the projection surface based on the size of the projection surface and the position of the optical sensor;
    adjust a spatial position of the projection surface with respect to the position of the optical sensor based on the adapted image or video after displaying the adapted image or video; and
    calibrate the optical sensor by adjusting a position of an optical axis of the optical sensor based on the image or video.

12. The calibration system of claim 11, wherein the control unit is further configured to adjust the spatial position of the projection surface with respect to the optical sensor by automatically adjusting the spatial position of the projection surface with respect to the optical sensor.

13. The calibration system of claim 11, wherein the control unit is further configured to adjust the spatial position of the projection surface with respect to the optical sensor by manually adjusting the spatial position of the projection surface with respect to the optical sensor.

14. The calibration system of claim 11, wherein the control unit is further configured to adapt the image or video displayed on the projection surface by deforming the image or video to the dimensions of the projection surface.

15. The calibration system of claim 11, wherein the image or video is a video.

16. The calibration system of claim 11, wherein the control unit is further configured to display the image or video on the projection surface by projecting the image or video from a projector.

17. The calibration system of claim 11, wherein the control unit is further configured to display the image or video on the projection surface by projecting the image or video on no more than one projection surface.

18. The calibration system of claim 11, wherein the projection surface is a television set.

19. The calibration system of claim 11, wherein the control unit is further configured to have an operator select the vehicle by choosing from different types of vehicles based on at least one of a manufacturer brand and model.

20. The calibration system of claim 11, further comprising a portable device comprising the control unit and configured to automatically or semi-automatically select the vehicle for calibration, and request an operator to confirm the selected vehicle via the portable device.

21. A control unit for calibrating an optical sensor in a vehicle, the control unit positionable external to the vehicle, the control unit configured to:
   determine a position of the optical sensor that is with respect to a projection surface that is external to the vehicle and positioned in front of the vehicle;
   select an image or video to be displayed;
   display the image or video from the projection surface;
   adapt the image or video displayed from the projection surface based on the size of the projection surface and the position of the optical sensor;
   adjust a spatial position of the projection surface with respect to the position of the optical sensor based on the adapted image or video after displaying the adapted image or video; and
   calibrate the optical sensor by adjusting a position of an optical axis of the optical sensor based on the image or video.

22. The control unit of claim 21, wherein the control unit is further configured to:
   determine the position of the optical sensor with respect to the projection surface;
   adjust the spatial position of the projection surface with respect to the optical sensor by automatically adjusting the spatial position of the projection surface with respect to the optical sensor; and
   adapt the image or video displayed from the projection surface by deforming the image or video to the dimensions of the projection surface.

* * * * *